Aug. 5, 1969  S. GIACHI  3,459,362
COMPOSITE REINFORCEMENT AND HANDGRIP FOR A LADIES HANDBAG
Filed Nov. 1, 1967

United States Patent Office 3,459,362
Patented Aug. 5, 1969

3,459,362
COMPOSITE REINFORCEMENT AND HANDGRIP
FOR A LADIES HANDBAG
Sante Giachi, Via S. Gervasio, 11 Florence, Italy
Filed Nov. 1, 1967, Ser. No. 679,737
Claims priority, application Italy, Nov. 15, 1966,
26,105/66
Int. Cl. B65d 29/00, 33/06
U.S. Cl. 229—54
2 Claims

ABSTRACT OF THE DISCLOSURE

A tube of flexible plastic material with a diametral extent equal to that of an open mouth of a handbag body is flattened and a template cut therefrom to produce a ring with a pair of opposed elongated loops thereon, the ring then being welded to the mouth of the handbag such that the ring constitutes a reinforcement and the loops a handle.

Brief summary of the invention

This invention relates to handgrips on the bodies of ladies handbags, and to handbags thus produced.

A first object of the invention is to provide a handgrip and a reinforcement for the opening of a handbag body made of plastic or similar material. According to the invention, the handgrip and reinforcement is produced by forming a tubular starting material, the circumferential extent of which corresponds to that of the opening of the handbag body, thereafter flattening the tubular material and then cutting a segment from the flattened tubular material along an outline so as to form a ring with two symmetrical loops which constitute handgrips when the ring is welded to the handbag body at the opening thereof.

The tubular material is advantageously drilled with a hole in the base of both loops at the level of the upper edge of the ring, and two cuts are made on one loop from the inside thereof to the respective holes, and on the other loop, from the outside thereof to the respective holes; this arrangement serves, when in use, to lock the handles, by crossing them and inserting one handle inside of the other.

A second object of the invention is to provide a composite handgrip and reinforcement for the opening of a handbag body made of a plastic material, and comprising a continuous annular element of a thermoplastic material, welded to the handbag body at the opening thereof and loops on the annular element constituting handles for the handbag.

The loops are provided with slits at their bases where they are joined to the annular element, the slits on one loop extending thereinto from the outside while the slits on the other loop extend thereinto from the inside whereby the loops can be interengaged by insertion of one within the other and interlocked at the slits.

Detailed description

Figure 1:
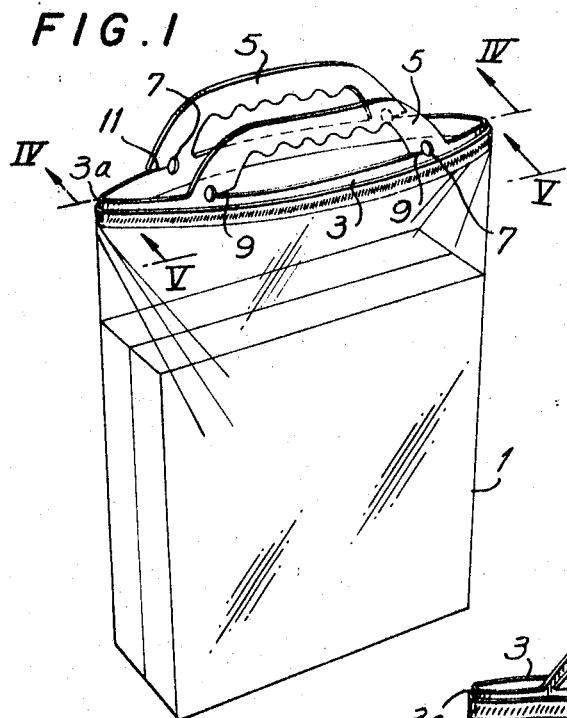
FIGURE 1 is a perspective view of a handbag according to the invention, with the mouth thereof open.
Figure 3:
FIGURE 3 is an enlarged sectional view taken along line III—III in FIG. 2.
Figure 2:
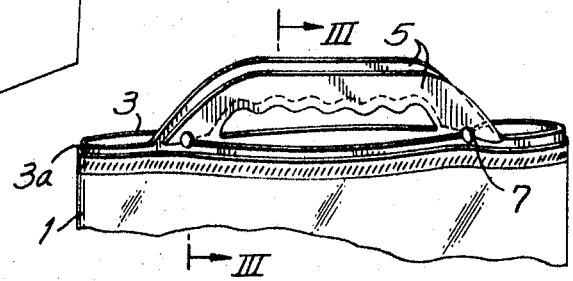
FIGURE 2 shows the top portion of the handbag with the mouth closed by the interlocking of the respective loops thereof.

As shown in the drawing, a handbag body 1 of a relatively thin plastic material is reinforced at the opening of the body by means of a continuous annular element 3 having loops 5 thereon which form handles for the handbag. The annular element 3 is particularly effective as a reinforcement in the regions 3a which are continually subjected to folding and unfolding during the closing and opening of the body 1. The element 3 particularly serves to prevent tearing of the body 1 as a consequence of the opening and closing of the handbag. The annular element represents an advantage with respect to the embodiments hitherto known in which provision is made for the joining of two elements which are substantially symmetrical but not fastened to each other, and wherein, the portions 3a of the opening of the handbag are not fully reinforced and left in weakened condition.

Figure 5:
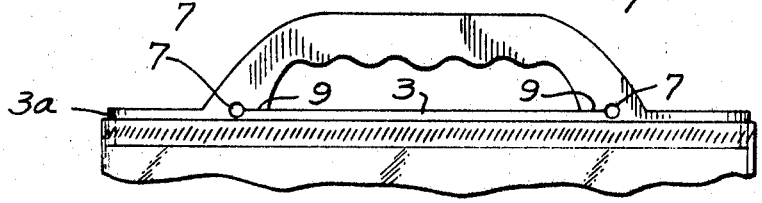

The composite reinforcement and handgrip formed by the annular element 3 and the loops 5 is obtained, easily and economically, using a tubular extruded thermoplastic material, which is flattened and cut along the outline, according to the template shown in FIG. 5, complete with the holes 7 but not the cuts 9, 11. The cuts 9 and 11 are made after the cutting of the element 3 with the loops 5. The circumferential extent of the tubular material is equal to that of the handbag body 1, and the element 3 is welded to the body 1 after the forming of the slits.

The loops 5 are interengaged, one within the other to close the handbag and the loops are interlocked, in a manner which will be explained later, to secure the closure of the handbag.

Figure 4:
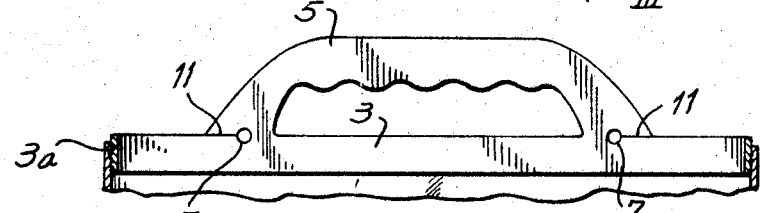
FIGURES 4 and 5 are sectional views taken along lines IV—IV and V—V respectively in FIG. 1.
Figure 6:
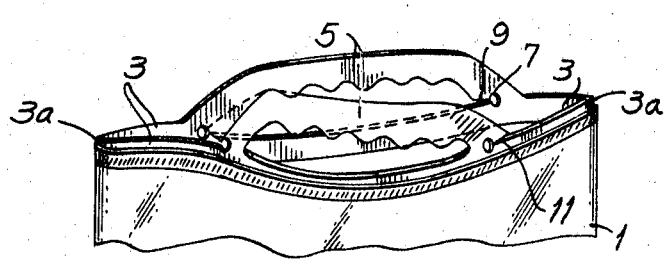
FIGURE 6 is a perspective view of the handgrip as the loops are being interlocked.

The loops 5 have holes 7 formed therein, and one loop, as shown in FIG. 5 has slits 9 which extend from the inside of the loop to the associated hole 7, whereas the other loop as shown in FIG. 4 has slits 11 which extend from the associated hole 7 to the outside of the loop. Thereby when one loop is inserted in the other, as shown in FIG. 6, the loops can be interlocked at the slits. In order to insure proper interlocking of the loops and minimize tearing thereof, the holes and slits 9, 11 are located at the base of the loops at the level of the upper edge of annular element 3.

What is claimed is:

1. A handgrip for a handbag having an open mouth, said handgrip being a one-piece body of thermoplastic material constituted by an annular ring secured to the handbag at the periphery of the open mouth thereof, and a pair of upstanding loops on the ring forming handles for the handgrip, said loops having bases where they are joined to said ring, said loops being provided with slits at said bases, said slits extending to the inside of one loop and to the outside of the other loop to permit interengagement of the loops by insertion of one within the other, said ring having an upper edge and said slits being positioned on the loops at the level of the upper edge of the ring, said loops having holes therein in the middle of the line of intersection between the loops and the ring, said slits extending to said holes.

2. A handgrip as claimed in claim 1, wherein said annular ring has a diametral extent the same as that of the open mouth of the handbag.

References Cited

UNITED STATES PATENTS

| 2,141,752 | 12/1938 | Hoarle | 229—44 |
| 3,310,224 | 3/1967 | Laguerre | 229—54 |
| 3,339,823 | 9/1967 | Nielsen | 229—54 |

DAVID M. BOCKENEK, Primary Examiner

U.S. Cl. X.R.

150—12